Jan. 28, 1969　　A. A. H. PREUSSER ET AL　　3,424,553
METHOD AND APPARATUS FOR CARRYING OUT
EXOTHERMIC GAS REACTIONS
Filed Oct. 12, 1965
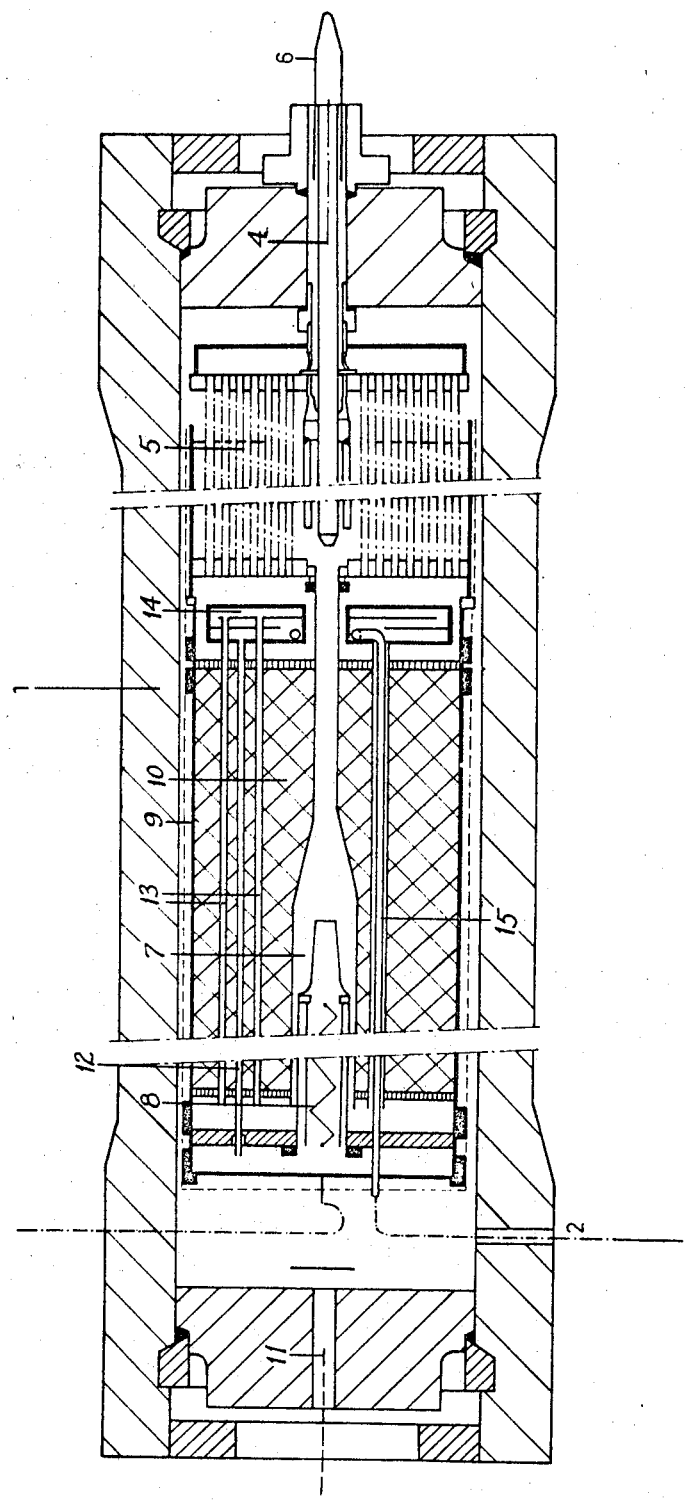

United States Patent Office 3,424,553
Patented Jan. 28, 1969

3,424,553
METHOD AND APPARATUS FOR CARRYING OUT EXOTHERMIC GAS REACTIONS
Anton A. H. Preusser, Haarlem, and Hendrik Sipkes, Velsen-Noord, Netherlands, assignors to Verenigde Kunstmeslfabrieken Mekog-Albatros N.V., Maliebaan, Utrecht, Netherlands, a company of Netherlands
Filed Oct. 12, 1965, Ser. No. 495,078
Claims priority, application Netherlands, Oct. 21, 1964, 6412227
U.S. Cl. 23—199    3 Claims
Int. Cl. C01c 1/04

ABSTRACT OF THE DISCLOSURE

A catalyst mass used in forming ammonia from a gaseous mixture of nitrogen and hydrogen is effectively cooled by passing the gaseous mixture in both parallel and countercurrent flow with respect to the direction of flow of the mixture when in contact with the catalyst for reaction purposes, through heat exchange means in contact with the catalyst mass. Such a cooling process is accomplished by an apparatus which includes a catalyst bed through which two groups of tubes run, a gas collecting chamber at one end of the bed to which both groups of tubes are connected, the tubes of one group having open ends at the other end of the catalyst bed, so as to provide an open connection between the tubes of said one group and the catalyst bed, the tubes of the other group being connected at said other end of the catalyst bed through a heat exchanger in which heat can be exchanged with the gaseous effluent from the catalyst bed at said one end thereof; and a separate direct connection to the collecting chamber for the supply of an extra quanity of synthesis gas.

---

The invention relates to a method of carrying out exothermic gas reactions, in particular the synthesis of ammonia from nitrogen and hydrogen, and to an apparatus in which these reactions can very suitably be carried out.

As is well known, the synthesis of ammonia from nitrogen and hydrogen is a process which is carried out on a large scale in practice. This synthesis is normally effected at elevated pressure, viz. 150–1000 atm. and elevated temperature, for example 400°–600° C., in the presence of a catalyst which usually consists substantially of porous iron. The reaction between nitrogen and hydrogen is exothermic and consequently care must be taken to ensure that the temperature of the catalyst mass in which the reaction takes place does not rise to an undesirable extent, since in that case the conversion is unfavourably affected. In order, therefore, to obtain maximum yields the temperature in the said synthesis must be kept at an optimum value as much as possible—depending on the ammonia content. Both too high and too low temperatures have an unfavourable influence on the conversion and therefore result in a reduced yield of ammonia. This, of course, must be avoided as much as possible.

In order to prevent the temperature of the catalyst mass from rising too strongly the latter is usually cooled by using the heat of the reaction to heat the synthesis gas, which consists of nitrogen and hydrogen, before this synthesis gas enters into direct contact with the catalyst mass to a temperature of between 300° and 450° C., preferably between 375° and 400° C. For this purpose this synthesis gas can be fed for example through tubes which pass through the catalyst bed, the synthesis gas moving in the tube in the same direction as the gas which is in direct contact with the catalyst bed heat being exchanged via the walls of the tubes.

However, a cooling method of this type possesses drawbacks. The part of the catalyst bed, near to the end where the gas enters is certainly cooled, but the synthesis gas during its passage through the tubes reaches such temperatures that it can hardly absorb any heat from the part of the bed near to the end where the gas leaves the bed. The consequence of this is that near to the latter end of the catalyst bed is substantially not, or insufficiently, cooled, so that the temperature of this part of the catalyst bed can become too high with the result that the conversion decreases. In addition, the optimum conversion temperature is lower in proportion as the ammonia concentration in the converted gas is higher, which implies that it is of essential importance for this part of the catalyst mass to be cooled sufficiently.

It should also be noted that the part of the catalyst bed which first comes into contact with the synthesis gas can become overheated owing to the intensity of the reaction which takes place, resulting in a too rapid reduction in catalyst activity, and in accompanying decrease in the conversion. In this method, therefore, the first part of the catalyst is intensively cooled, as a result of which, however, the cooling of the remaining catalyst mass is unfortunately is less effective.

Undesirable consequences likewise arise if the synthesis gas which is acting as coolant is passed through a tube in a direction contrary to the direction of flow of the gas coming into contact with the catalyst mass. In this case the part of the catalyst bed, in which the reaction chiefly takes place, is not cooled, or is cooled only very insufficiently, while the part of the bed near to the end where the gas leaves is cooled too strongly. The result of this is that the conversion is again unfavourably affected.

The invention now provides a method for carrying out exothermic gas reactions, in particular the synthesis of ammonia, in which the above-mentioned drawbacks are obviated and therefore a more adequate cooling of the total catalyst bed is obtained with an accompanying greater degree of conversion.

The principle on which the improved cooling of the catalyst bed according to the invention is based is that this bed is cooled with synthesis gas which proceeds through tubes in a direction both in parallel flow and in counterflow with the direction in which the synthesis gas flows through the catalyst bed.

The invention therefore relates to a method for carrying out reactions in the gaseous phase, in particular the synthesis of ammonia from nitrogen and hydrogen, in which method synthesis gas preheated by heat exchange with the already converted gas mixture is passed through a catalyst bed, but before coming into contact with the catalyst mass is passed through one or more tubes located in the catalyst bed in the same direction as that in which the gas flows in direct contact through the catalyst bed, and after having been mixed with cold synthesis gas, is passed again through tubes located in the catalyst bed, this time, however, in a direction contrary to the direction in which the gas flows in direct contact through the catalyst bed.

The quantity of the cold synthesis gas added to the preheated gas is such that the resultant mixture brings the part of the catalyst bed, with which it comes first into heat exchange, within the desired temperature range. The remaining part of the catalyst bed is substantially cooled to the desired temperature by means of heat exchange with the synthesis gas which flows through tubes in the same direction as the gas which is in direct contact with the catalyst.

The cooling efficiency of the synthesis gas is preferably such that the catalyst bed is maintained at a temperature of between 450° C. and 550° C.

The apparatus suitable for use with the method according to the invention comprises a catalyst bed through which two groups of tubes run, a gas collecting chamber at one end of the bed to which both groups of tubes are connected, the tubes of one group having open ends at the other end of the catalyst bed, so as to provide an open connection between the tubes of said one group and the catalyst bed, the tubes of the other group being connected at said other end of the catalyst bed through a heat exchanger in which heat can be exchanged with the gaseous effluent from the catalyst bed at said one end thereof; and a separate direct connection to the collecting chamber for the supply of an extra quantity of synthesis gas.

In order to elucidate the above method and the apparatus suitable for use therewith the accompanying figure shows a longitudinal cross section of a suitable embodiment of a device acccording to the invention.

The apparatus comprises a cylindrical pressure vessel having a wall 1 and provided with inlets 11, 4 and 2. Inside the pressure vessel having a wall 1 is situated a cylindrical inner vessel 9 in which are arranged a heat exchanger 5, a tube 7 with a heating element 8, and a catalyst bed 10. Through the inlet 11 is passed the arriving synthesis gas which flows through the annular space between 1 and 9, chiefly with the aim of keeping the wall temperature of 1 low, for example 100° C. This results in the gas being heated. In the heat exchanger 5 the gas is further heated by means of heat exchange with the gas which has left the catalyst bed and which has a temperature of for example 400°–500° C. Cold synthesis gas can be supplied through an inlet 4. The thus already preheated synthesis gas is then passed through the tube 7 in which is arranged the electric heating element 8.

The thus preheated gas is passed through a tube 12 in which the gas serves as coolant for the catalyst mass 10. In the gas collecting chamber or drum 14 the synthesis gas which has served as coolant is mixed with the cold synthesis gas which has been introduced through inlet 2 and is flowing through the insulated line 15. The resulted mixture is passed via tubes 13 through the catalyst mass 10. In these tubes 13 this gas mixture, which has been again brought down to a lower temperature by being mixed with cold synthesis gas, acts particularly as a coolant for the part of the catalyst mass, with which this gas mixture from the drum 14 first comes into heat exchange contact. The quantity of cold synthesis gas which should be supplied to the drum 14 via the tube 15 is at the same time such that when the gas leaves the tube 13 it has, as a result of the heat exchange which has taken place there, the desired temperature at which the synthesis gas first comes into direct contact with the catalyst mass. After leaving the catalyst bed the converted ammonia-containing gas mixture which results leaves the pressure vessel via the heat exchanger 5 and a discharge line 6.

The above drawing is only diagrammatic and it will be obvious that many variations can be introduced while maintaining the simultaneous cooling in parallel and counterflow of the catalyst mass. In practice there will be a large number of tubes 12 and 13 passing through the catalyst mass in order to ensure that the cooling of the catalyst mass and the pre-heating of the synthesis gas takes place as efficiently as possible,

EXAMPLE

The table represents the results of two experiments under practical working conditions of a small commercial synthesis-reactor which was built according to the invention. The reaction contained 1.5 cu. mtr. of catalyst and was applied as a pre-contact reactor. Apart from the fact that the fresh gas does not contain ammonia, but possibly somewhat more impurities, the working conditions may be assumed to be similar to those which might be expected in a large reactor, built according to the invention.

Column A represents characteristic working conditions with normal load. It appears that an abnormally high ammonia content is achieved, which is in accordance with the invention.

Column B represents the working conditions for a heavy load; it appears that now a high production may be achieved. It also appears that in both cases the heat distribution well nears the optimal heat distribution. The two examples do not represent excessive conditions, and do not restrict the invention to these conditions, but only state the results of measurements of a limited series of experiments. In this series of experiments the quantity of gas to the mixing chamber varied from 20–45% of the total quantity of fresh gas.

TABLE.—WORKING CONDITIONS OF A SMALL COMMERCIAL SYNTHESIS REACTOR, BUILT ACCORDING TO THE INVENTION

| Catalyst content, 1.5 cu. mtr. | A | B |
| --- | --- | --- |
| Quantity of fresh gas, N m.³/h | 15,000 | 25,000 |
| Inlet, NH₃ content, percent vol | Nil | Nil |
| Outlet, NH₃ content, percent vol | 18.4 | 16.7 |
| Production metric tons, N/day | 35 | 54 |
| Percent gas to mixing chamber | 42 | 22 |
| Pressure atmospheres | 289 | 292 |
| Inert gas content, percent vol | 0.3 | 0.3 |
| Temperatures, degrees centigrade: | | |
| Above the catalyst | 460 | 449 |
| One-quarter from top | 485 | 512 |
| Half way down | 568 | 556 |
| Three-quarters from top | 536 | 546 |
| Bottom of catalyst | 455 | 492 |
| Wall temperatures | 56–128 | 42–84 |

We claim:

1. A method for carrying out the synthesis of ammonia by leading a mixture of nitrogen and hydrogen in direct contact through a catalyst bed in which method said mixture is preheated by means of heat exchange with the converted gas mixture, and thereafter is passed through a group of tubes located in said catalyst bed, the direction of flow of the gas mixture in said group of tubes being equal to the direction of flow of the gas mixture in direct contact with the catalyst bed, whereupon the gas mixture having passed through said group of tubes and having exchanged heat with the catalyst bed through the walls of said tubes, is mixed with a cold mixture of nitrogen and hydrogen and is thereupon passed through a second group of tubes located in said catalyst bed, the direction of flow of the gas mixture in said second group of tubes being contrary to the direction of flow of the gas mixture in direct contact with the catalyst bed, the gas mixture having passed through said second group of tubes and having exchanged heat with the catalyst bed through the walls of the tubes of said second group of tubes being passed through and in direct contact with the catalyst bed.

2. A method as claimed in claim 1, in which the relative proportion of the quantity of cold mixture of nitrogen and hydrogen added to the second group of tubes to the quantity of mixture of nitrogen and hydrogen fed to the first group of tubes is such that the catalyst bed is maintained entirely at temperatures between 450 and 550° C.

3. An apparatus suitable for use for the synthesis of ammonia comprising a catalyst bed, through which two groups of tubes run; a gas collecting chamber at one end of the catalyst bed, to which gas collecting chamber the two groups of tubes are connected, but which is not directly connected with said catalyst bed, the tubes of one group having open ends at the other end of the catalyst bed, so as to provide an open connection between the tubes of said one group and the catalyst bed, the tubes of the other group being connected at said other end of the catalyst bed through a heat exchanger with a feed line for the synthesis gas (i.e., the initial gaseous mixture of nitrogen and hydrogen), in which heat exchanger heat can be exchanged with the gaseous effluent from the catalyst bed at said one end thereof; and a separate direct connection to the collecting chamber for the supply of an extra quantity of cold synthesis gas.

References Cited
UNITED STATES PATENTS

| | | | |
|---|---|---|---|
| 1,707,417 | 5/1929 | Richardson | 23—199 |
| 2,052,326 | 8/1936 | Uhde | 23—199 |

OSCAR R. VERTIZ, *Primary Examiner.*

H. S. MILLER, *Assistant Examiner.*

U.S. Cl. X.R.

23—288